(12) United States Patent
Chen et al.

(10) Patent No.: US 7,488,555 B2
(45) Date of Patent: *Feb. 10, 2009

(54) BATTERY COVER ASSEMBLY FOR PORTABLE ELECTRONIC DEVICE

(75) Inventors: Rui Hao Chen, Shenzhen (CN); Chia-Hua Chen, Tu-Chen (TW); Ying Liang Tu, Shenzhen (CN)

(73) Assignees: Hong Fu Jin Precision Industry (Shen Zhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 896 days.

This patent is subject to a terminal disclaimer.

(21) Appl. No.: 10/842,775

(22) Filed: May 10, 2004

(65) Prior Publication Data

US 2004/0224221 A1 Nov. 11, 2004

(30) Foreign Application Priority Data

May 9, 2003 (TW) .............................. 92208562 U

(51) Int. Cl.
*H01M 2/10* (2006.01)
*H05K 5/00* (2006.01)
(52) U.S. Cl. ........................ 429/100; 429/96; 361/679
(58) Field of Classification Search ................ 429/96, 429/98, 99, 100; 361/679, 814; 455/575.1, 455/575.3, 575.4, 575.6, 575.8
See application file for complete search history.

(56) References Cited

U.S. PATENT DOCUMENTS

| 5,436,088 | A | 7/1995 | Castaneda et al. |
| 6,157,545 | A | 12/2000 | Janninck et al. |
| 6,409,042 | B1 * | 6/2002 | Hirano et al. ............... 220/812 |
| 6,929,878 | B2 * | 8/2005 | Chen et al. .................. 429/100 |
| 7,068,495 | B2 * | 6/2006 | Luo et al. .................... 361/679 |
| 2002/0076607 | A1 * | 6/2002 | Chang ........................ 429/100 |
| 2002/0193082 | A1 * | 12/2002 | Uemura et al. ................ 455/90 |

\* cited by examiner

*Primary Examiner*—Patrick Ryan
*Assistant Examiner*—Muhammad Siddiquee
(74) *Attorney, Agent, or Firm*—Wei Te Chung

(57) ABSTRACT

A battery cover assembly includes a battery cover (3) defining guiding slots (326) therein, a connecting member (2), a housing (1) defining a battery-receiving compartment (194), a plurality of springs (5), and a rod (4). The housing includes a left sidewall (16), a partion wall (19), a first step (161) and a second step (163) connecting against the left sidewall, defining a receiving recess (167). The connecting member is slidingly received in the guiding slots along a lateral direction. The rod inserts through the connecting member, the springs, and secured in the receiving recess such that the battery cover can rotate about the rod. When the battery cover is rotated downwardly to the housing, a force is required to press the battery cover down upon the housing, and then inwardly along a direction toward the rod until locking projections (302) on the cover catch in troughs (182) defined in the housing.

19 Claims, 4 Drawing Sheets

BATTERY COVER ASSEMBLY FOR PORTABLE ELECTRONIC DEVICE

BACKGROUND OF THE INVENTION

1. Field of the Invention

The present invention generally relates to battery cover assemblies, and more particularly to a battery cover assembly for use in a portable electronic device.

2. Prior Art

As a power source, batteries are widely used in portable electronic devices, such as personal digital assistants (PDAs), cellular phones and so on. Conventional batteries are attachably received in the electronic devices, and battery covers are designed to connect with housings of the electronic devices to package the batteries. The batteries have to be replaced by opening the battery covers when the batteries are damaged or can not be recharged with electricity any more.

A clasp structure or latch structure is used with a conventional battery cover to engage with a housing of a portable electronic device. For example, a cellular phone marked Alcatel OT310 has a latch for the battery cover. The latch comprises a pair of hooks at one end of the battery cover and a locking pin protruding from the other end of the battery cover. Accordingly, a pair of troughs is defined in an end portion of a backside of a housing of the cellular phone, and a locking hole is defined in the other end portion of the backside of the housing. In assembly, the hooks are firstly inserted into the troughs in the backside of the housing. Then, the battery cover is pressed downwardly to the housing until the locking pin on the battery cover is inserted into the locking hole in the backside of the housing. The battery cover is thus assembled to the housing of the cellular phone. The battery cover is simple in structure, and the engagement between the battery cover and the housing of the cellular phone is firm, too. However, during disassembly, the battery cover is susceptible to being damaged, since a greater force is exerted thereon. As a result, it is inconvenient for a user to change a battery in the housing of the cellular phone.

In addition, most conventional battery covers or battery packages are separate from housings of portable electronic devices. The battery covers need to be opened and taken off when changing batteries, and then the battery covers have to be remounted to the housing after the batteries are changed. During the course of changing the batteries, the disassembled battery covers could be lost due to a user's carelessness.

SUMMARY OF THE INVENTION

Accordingly, an object of the present invention is to provide a battery cover assembly which is convenient for a user to open and close, and for which the battery cover is not susceptible to being lost when it is opened.

To achieve the above-mentioned object, a battery cover assembly includes a battery cover defining a pair of guiding slots, a connecting member, a housing, a plurality of springs, and a rod. The connecting member includes a main body, two side wings, a hook-shaped folding arm extending from each side wing. The housing comprises a top wall, a bottom wall, a left sidewall, a right sidewall, and a partition wall. An inner wall protrudes from the partition wall, and connects against the left sidewall. The inner wall is cut out to form a first step, a second step, and a receiving recess therebetween for receiving the rod. The connecting member is slidingly received in the guiding slots along a lateral direction, and the rod is longitudinally inserted through the folded arms of the connecting member and the spring members, and is finally secured in the receiving recess such that the battery cover can rotate about the rod to different positions. When the battery cover is rotated downwardly to the housing, a predetermined force is required to press the battery cover down, and then a force is required along a direction toward the rod. The battery cover locks into place on the housing when locking projections on the cover engage into troughs on the housing.

DETAILED DESCRIPTION OF THE INVENTION

Figure 1:
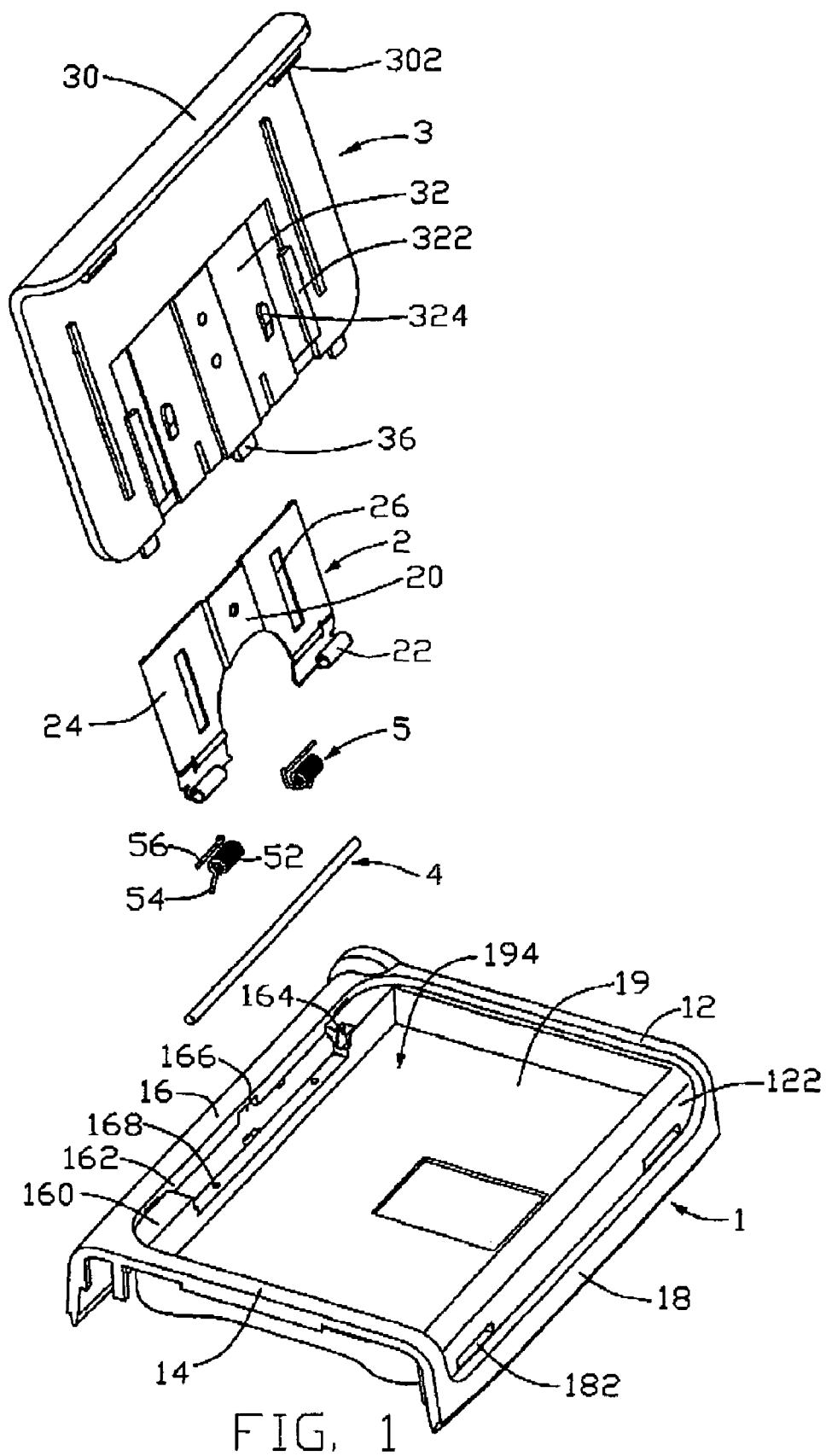
FIG. 1 is an exploded perspective view of a battery cover assembly in accordance with a preferred embodiment of the present invention.

Referring to FIG. 1, a battery cover assembly for use in a mobile phone (not shown) will be taken here as an example to disclose details according to a preferred embodiment of the present invention. The battery cover assembly comprises a housing 1, a connecting member 2, a cover 3, a rod 4, and a plurality of springs 5.

The housing 1 comprises a top wall 12, a bottom wall 14, a left sidewall 16, and a right sidewall 18 together defining a rectangular space (not labeled). The rectangular space is separated into a first compartment 192 and a second compartment 194 by a partition wall 19. The partition wall 19 is formed at an intermediate position between an upper surface (not labeled) and a lower surface (not labeled) of the housing 1. An inner wall 162 protrudes from the partition wall 19, and connects against the left sidewall 16. The inner wall 162 is cut out to form a first step 161, a second step 163, and a receiving recess 167 therebetween for receiving the rod 4. The receiving recess 167 is in communication with the second compartment 194. An opening (not shown) and a mounting hole 164 are defined in cross sections of the first step 161 and the second step 163 for receiving ends of the rod 4. A plurality of apertures 168 is defined in a bottom of the receiving recess 167. A rectangular opening 166 is defined in the left sidewall 16 and is in communication with the receiving recess 167.

The first compartment 192 is for accommodating electronic components, such as a printed circuit board therein after assembly of the housing 1 with other housings (not shown) of the cellular phone. The second compartment 194 is used to receive batteries or a battery package therein. An elongated recess 122 is defined in an outside surface (not labeled) of the right sidewall 18. A pair of troughs 182 is defined in the recess 122, and the troughs 182 are located near the top wall 12 and the bottom wall 14, respectively.

The connecting member 2 is made of elastic material, such as metal material, by way of stamping. The connecting member 2 comprises a main body 20 and a pair of side wings 24 extending from two opposite sides of the main body 20. The pair of side wings 24 is in one plane, which is lower than the plane of the main body 20. A hook-shaped folding arm 22 extends from a longitudinal end of each side wings 24. A slot 26 is defined in each side wing 24.

Figure 4:
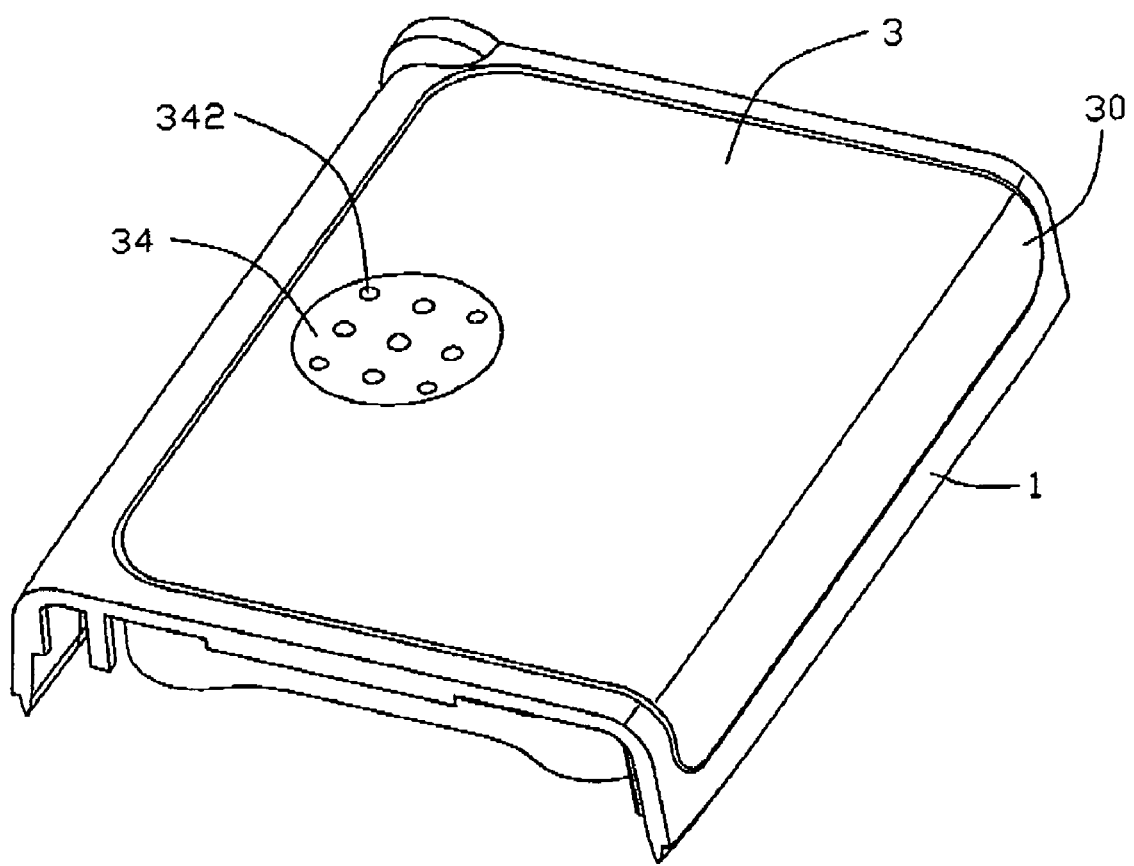
FIG. 4 is a perspective view of the assembled battery cover assembly, in which the cover is in a closed position, covering the housing.

The cover 3 is substantially rectangular in shape and comprises a sidewall 30 extending from a longitudinal side thereof. Two parallel, elongated recesses 32 are defined along a lateral direction in an inner side of the cover 3, spaced from each other a certain distance. An elongated block 322 is formed adjacent to an outside edge of each recess 32, protruding from the inner side of the cover 3. The elongated blocks 322 extend to hang over each recess 32, defining a pair of guiding slots 326 for slideably receiving the side wings 24 of the connecting member 2. A block 324 extends from a bottom surface of each recess 32 at a proximal side of the cover 3. The block 324 has a slant surface at a proximal end (not labeled) and can be positioned in the slot 26 of the connecting member 2. The block 324 can be slided therein since the length of the slot 26 is greater than that of the block 324. Two locking projections 302 protrude from an inner surface of the sidewall 30 to engage with the pair of troughs 182 defined in the recess 122 of the housing 1. Referring to FIG. 4, a circular pressing portion 34 is formed on an outside surface of the cover 3, adjacent to a longitudinal side of the cover 3 opposite the side from which the sidewall 30 depends. A plurality of nipples 342 protrudes from an outside surface of the pressing portion 34 to increase a frictional force when the pressing portion 34 is pressed. A plurality of mounting protrusions 36 extends from the side of the cover 3 which is opposite to the sidewall 30.

The rod 4 is preferred to be hollow and is secured within the receiving recess 167 by inserting ends thereof into the opening and the mounting hole 164 of the first step 161 and second step 163. Of course, the rod 4 can also be solid which increases weight of the mobile phone.

Each spring 5 comprises a coil-shaped body 52, a first end portion 54 extending along a tangent to the coil-shaped body 52, and a second end portion 56 extending parallel to a longitudinal axis of the coil-shaped body 52.

Figure 2:
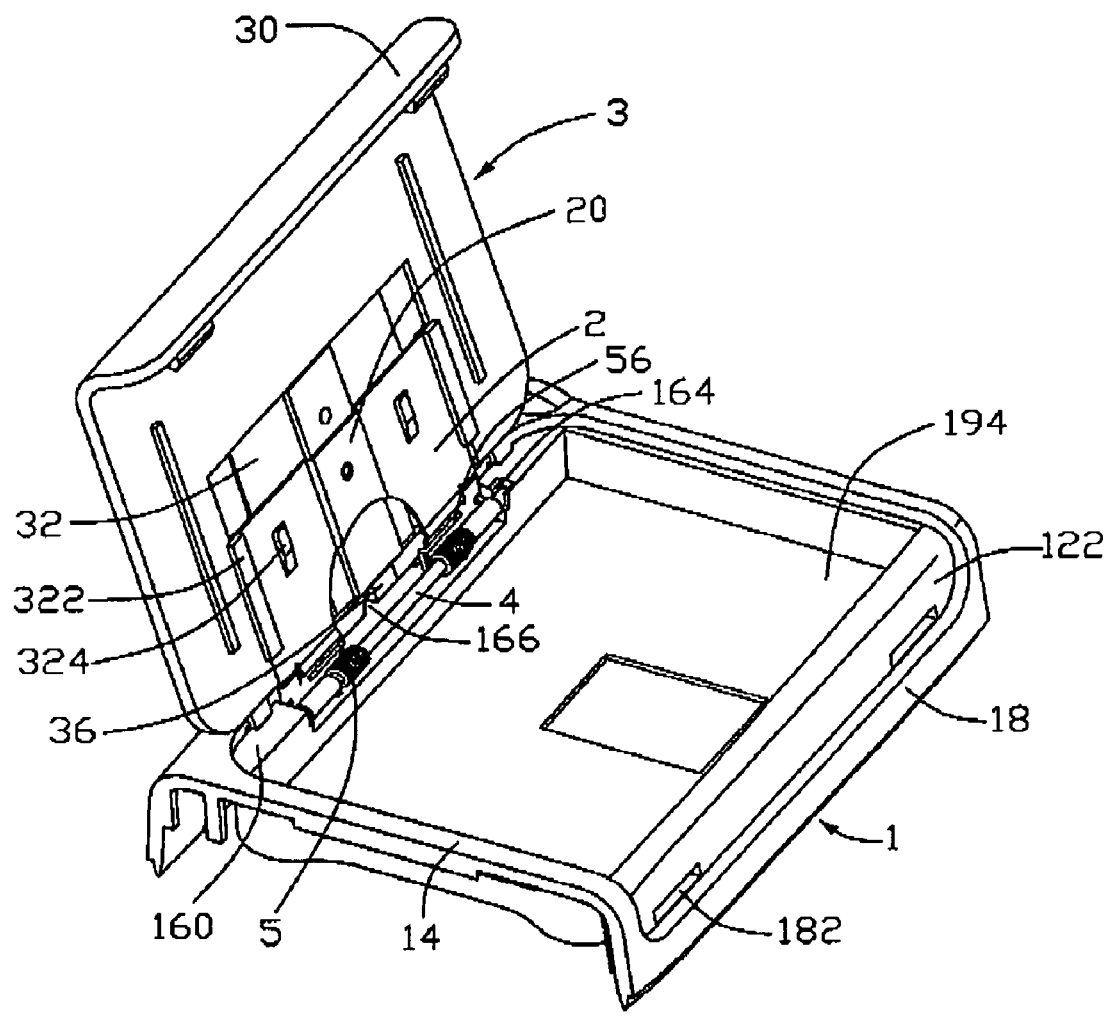
FIG. 2 is a perspective view of an assembled battery cover assembly, in which a cover is in an open position.
Figure 3:
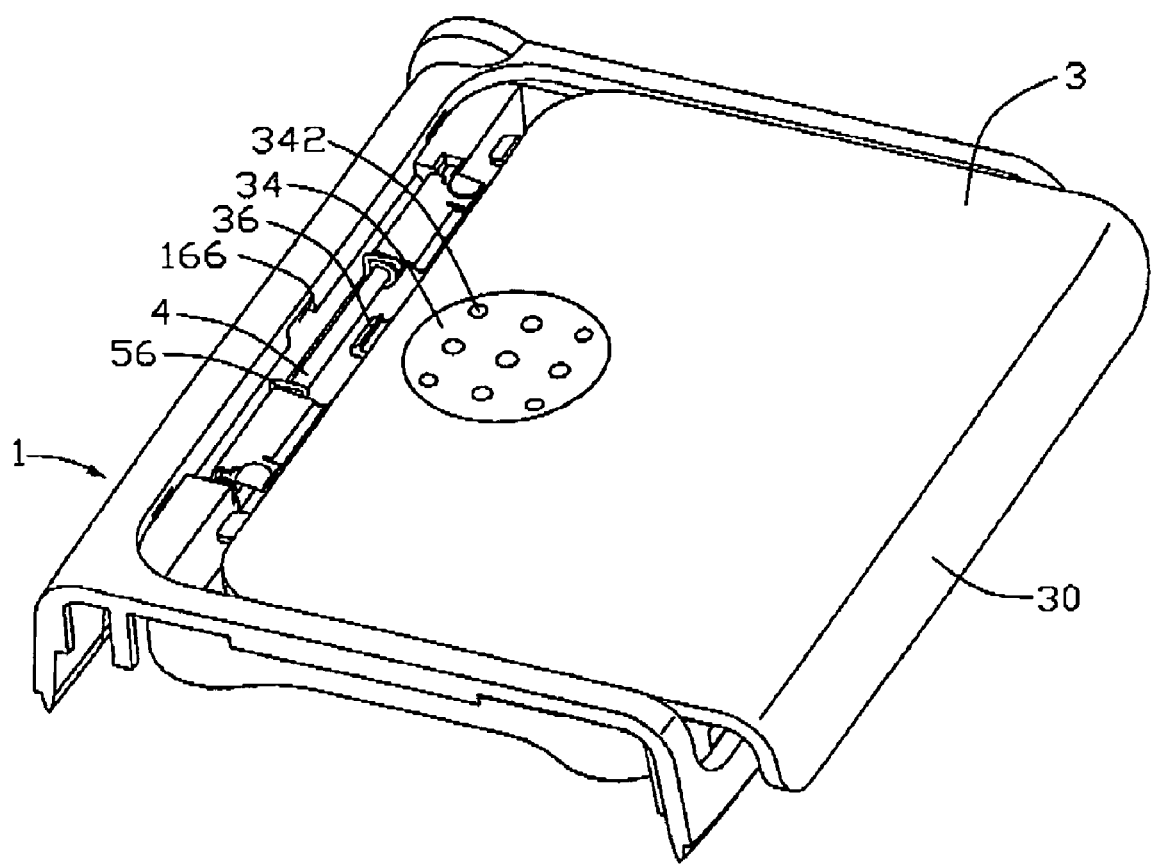
FIG. 3 is a perspective view of the assembled battery cover assembly, in which the cover is about to cover a housing of the battery cover assembly.

Referring to FIGS. 2 and 3, in assembly, the connecting member 2 is assembled to the cover 3 with the pair of side wings 24 being inserted into the guiding slots 326 defined by the protruding blocks 322 and the recesses 32. During the course of inserting the side wings 24 into the guiding slots 326, the block 324 is easily positioned into the slot 26 of the connecting member 2, since the block has slant surface at a proximal end thereof. The guiding slots 326 are slightly longer than that of the side wings 24, so that the connecting member 2 can move back and forth relative to the battery cover 3 in a small range. However, the connecting member 2 is prevented from moving out of the guiding slots 326 since the block 324 can only be slided in a range of the slot 26 of the connecting member 2.

The rod 4 is inserted through one of the folded arms 22, through one of the springs 5, through the other folding arm 22, and through the other spring 5. The diameter of the rod 4 is slightly greater than that of the coils of the springs 5 so that a particular tool is required to realize this assembly. Then, the rod 4 is inserted into the opening of the first step 161. Next, the other end of the rod 4 is mounted into the mounting hole 164 of the second step 163. The rod is thus secured in the receiving recess 167.

Referring to FIG. 2 again, a battery package (not shown) is put into the second compartment 194 when the cover 3 is in an open position. Then, the cover 3 together with the connecting member 2 is rotated downwardly about the rod 4 to the housing 1. In this process, a certain force is required to be exerted on the pressing portion 34 of the battery cover 3 to overcome the spring force produced by the springs 5. When the cover 3 is rotated to a status as shown in FIG. 3, the housing 1 is about to be covered by the cover 3. The mounting protrusions 36 are inserted into the mounting grooves 166 and the locking projections 302 are inserted into the troughs 182 when the cover 3 is pushed along a direction toward the rod 4. Referring to FIG. 4, the battery package is thus received in the second compartment 194, and the housing 1 is completely covered by the cover 3, since the sidewall 30 of the cover 3 is received in the recess 122 of the housing 1.

To take the battery package out of the second compartment 194, the pressing portion 34 is pushed to move the cover 3 along a direction away from the rod 4. Then, the mounting protrusions 36 are disengaged from the mounting grooves 166 and the locking projections 302 are disengaged from the troughs 182 when the cover 3 is moved a certain distance relative to the connecting member 2 under the pushing force. Finally, the cover 3 is rotated back to the open position under the spring force produced by the springs 5. The cover 3 is thus opened and the battery package can be removed.

Compared with other battery cover assemblies in the prior art, the battery cover 3 is not easy as easily lost when it is opened to change the battery package, since the battery cover 3 is rotatably connected to the housing 1. It is also convenient for a user to open and close the battery cover 3.

It is believed that the present invention and its advantages will be understood from the foregoing description and it will be apparent that various changes may be made thereto without departing from the spirit and scope of the invention or sacrificing all of its material advantages, the examples hereinbefore described merely being preferred or exemplary embodiments of the invention.

We claim:

1. A battery cover assembly for use in a portable electronic device, comprising:
   a battery cover;
   a connecting member slidingly connected to the battery cover, the connecting member comprising a main body and two folded arms extending therefrom;
   a housing defining at least a compartment for accommodating a battery package and a receiving recess in communication with the compartment;
   a plurality of springs; and
   a rod received in the receiving recess; wherein
   the connecting member is rotatably connected to the housing by the rod inserting through the folded arms and the springs such that the battery cover is rotated to different positions around the rod.

2. The battery cover assembly of claim 1, wherein the housing comprises a top wall, a bottom wall, a left sidewall, a right sidewall, and a partition wall, and an inner wall protrudes from the partition wall and connects against the left sidewall.

3. The battery cover assembly of claim 2, wherein the inner wall is cut out to form a first step, a second step, and the receiving recess therebetween.

4. The battery cover assembly of claim 3, wherein an opening and a mounting hole are defined in cross sections of the first step and the second step.

5. The battery cover assembly of claim 4, wherein a plurality of apertures is defined in a bottom of the receiving recess.

6. The battery cover assembly of claim 1, wherein an opening is defined in the left sidewall and is in communication with the receiving recess.

7. The battery cover assembly of claim 2, wherein the battery cover comprises a sidewall extending from one side thereof, and plurality of locking projections protrudes from a inner surface of the sidewall.

8. The battery cover assembly of claim 7, wherein an elongated recess is defined in an outside surface of the right sidewall, and a plurality of troughs is defined in the elongated recess for receiving the plurality of locking projections of the sidewall of the battery cover.

9. The battery cover assembly of claim 1, wherein an elongated recess is defined along a lateral direction in an inner side of the battery cover, a protruding block protrudes from the inner side of the battery cover, adjacent to the recess, and a guiding slot is defined by the protruding block and the recess.

10. The battery cover assembly of claim 1, wherein the connecting member comprises a pair of side wings extending from two opposite sides of the main body and a plurality of slots defined through the pair of side wings.

11. The battery cover assembly of claim 10, wherein the pair of side wings is in one plane which is lower than the plane of the main body.

12. The battery cover assembly of claim 11, wherein the folded arms extends from a longitudinal end of each of the side wings.

13. A battery cover assembly for use in a portable electronic device, comprising:
  a battery cover;
  a connecting member slidingly connected to the battery cover, the connecting member comprising a main body and two folded arms extending therefrom;
  a housing comprises a top wall, a bottom wall, a left sidewall, a right sidewall, and a partition wall defining at least a compartment for accommodating a battery package; and
  a rod positioned between the top wall and the bottom wall, adjacent the left sidewall; wherein
  the connecting member is rotatably connected to the housing by the rod inserting through the folded arms such that the battery cover is rotated to different positions around the rod.

14. The battery cover assembly of claim 13, wherein a first step and a second step protrude from the partition wall, and connect against the left sidewall.

15. The battery cover assembly of claim 14, wherein an opening and a mounting hole are defined in cross sections of the first step and second step for receiving ends of the rod.

16. The battery cover assembly of claim 13, further comprising a plurality of spring members, each of the spring members including a coil-shaped body, a first end portion extending along a tangent of the coil-shaped body, and a second end portion extending along a direction parallel to an axis of the coil-shaped body, wherein the first end portion is secured with the housing, the second end portion abuts against the connecting member, and the rod is inserted through the coil-shaped body.

17. The battery cover assembly of claim 13, further comprising a block protruding from an inner side of the battery cover, and an elongated slot being defined through the connecting member for slidingly receiving the block.

18. The battery cover assembly of claim 1, wherein the battery cover is slideable toward the rod to cover the housing or away from the rod to expose the housing, and is rotatable about the rod.

19. The battery cover assembly of claim 13, wherein the battery cover is slideable toward the rod to cover the housing or away from the rod to expose the housing, and is rotatable about the rod.

* * * * *